(12) United States Patent
Øllgaard et al.

(10) Patent No.: US 7,987,640 B2
(45) Date of Patent: Aug. 2, 2011

(54) FOUNDATION FOR A WIND TURBINE

(75) Inventors: Børge Øllgaard, Esbjerg (DK); Søren Poul Jensen, Varde (DK)

(73) Assignee: Vestas Wind Systems A/S, Randers SV (DK)

( * ) Notice: Subject to any disclaimer, the term of this patent is extended or adjusted under 35 U.S.C. 154(b) by 0 days.

(21) Appl. No.: 12/711,686

(22) Filed: Feb. 24, 2010

(65) Prior Publication Data
US 2010/0269437 A1 Oct. 28, 2010

(30) Foreign Application Priority Data

Feb. 26, 2009 (DK) .................... PA 2009 00269

(51) Int. Cl.
*E02D 19/00* (2006.01)
(52) U.S. Cl. ............ 52/169.14; 52/169.13; 52/170; 52/40; 52/297; 52/274; 416/DIG. 6
(58) Field of Classification Search ............ 52/40, 294, 52/295, 296, 297, 2.22, 2.24, 741.4, 746.1, 52/274, 273, 169.13, 169.14, 170, 219, 58, 52/835, 302.5; 405/302.7; 416/DIG. 6; 256/13.1
See application file for complete search history.

(56) References Cited

U.S. PATENT DOCUMENTS

| | | | | |
|---|---|---|---|---|
| 1,735,722 A * | 11/1929 | Beard | .......... | 52/168 |
| 2,210,441 A * | 8/1940 | Bachman | .......... | 52/297 |
| 3,992,842 A * | 11/1976 | Haage et al. | .......... | 52/309.8 |
| 4,113,907 A * | 9/1978 | Haage et al. | .......... | 428/111 |
| 4,183,505 A * | 1/1980 | Maestri | .......... | 256/13.1 |
| 4,239,795 A * | 12/1980 | Haage et al. | .......... | 428/60 |
| 4,854,105 A * | 8/1989 | Delisle | .......... | 52/698 |
| 5,094,056 A * | 3/1992 | Peters | .......... | 52/410 |
| 5,328,647 A * | 7/1994 | Koob | .......... | 264/34 |
| 5,414,964 A * | 5/1995 | Bodycomb | .......... | 52/58 |
| 5,586,417 A | 12/1996 | Henderson et al. | | |
| 5,625,988 A * | 5/1997 | Killick | .......... | 52/298 |
| 6,021,620 A * | 2/2000 | Vermilion et al. | .......... | 52/741.4 |
| 6,338,232 B1 * | 1/2002 | Yamanaka et al. | .......... | 52/746.1 |
| 6,513,291 B2 * | 2/2003 | Gilsdorf | .......... | 52/297 |
| 6,623,578 B2 * | 9/2003 | Wasitis et al. | .......... | 156/71 |
| 6,665,990 B1 * | 12/2003 | Cody et al. | .......... | 52/295 |
| 6,948,287 B2 * | 9/2005 | Korn | .......... | 52/393 |
| 7,192,219 B2 * | 3/2007 | Graziosi | .......... | 405/229 |
| 7,226,237 B2 * | 6/2007 | Ceccarelli | .......... | 404/6 |

(Continued)

OTHER PUBLICATIONS

Henrik Mensing; 1st Technical Examination Report issued in priority application No. PA 2009 00269; Oct. 12, 2009; 5 pages.; Denmark Patent and Trademark Office.

*Primary Examiner* — Robert J Canfield
*Assistant Examiner* — Matthew J Gitlin
(74) *Attorney, Agent, or Firm* — Wood, Herron & Evans, L.L.P.

(57) ABSTRACT

Embodiments of the invention provide a foundation for a wind turbine. The foundation includes a section which is partly embedded in a concrete section and a cover which is arranged across an intersection between the embedded section and the concrete section. In that way, intrusion of water between the sections can be prevented effectively, and the lifetime of the foundation can be increased and/or the maintenance costs can be reduced. A method of making a foundation for a wind turbine and a wind turbine with the foundation are also disclosed.

10 Claims, 2 Drawing Sheets

U.S. PATENT DOCUMENTS

| | | | |
|---|---|---|---|
| 7,618,217 B2 * | 11/2009 | Henderson | 405/255 |
| 2002/0066255 A1 | 6/2002 | Harris et al. | |
| 2002/0124502 A1 * | 9/2002 | Henderson | 52/296 |
| 2002/0152695 A1 * | 10/2002 | Gilsdorf | 52/98 |
| 2005/0150176 A1 * | 7/2005 | Erekson | 52/58 |
| 2007/0224002 A1 * | 9/2007 | Scholl | 405/231 |
| 2008/0106094 A1 * | 5/2008 | Edelmayer | 285/42 |
| 2008/0196351 A1 * | 8/2008 | Seth | 52/741.4 |

* cited by examiner

FOUNDATION FOR A WIND TURBINE

CROSS-REFERENCE TO RELATED APPLICATION

This application claims priority under 35 U.S.C. §119(a) to DK Application No. PA 2009 00269, filed 26 Feb. 2009.

TECHNICAL FIELD

The present invention relates to a foundation for a wind turbine and a method for laying a foundation of a wind turbine or similar tower construction. Furthermore, the invention relates to a wind turbine with such a foundation and to a cover for covering an intersection between two elements of a wind turbine foundation.

BACKGROUND

When laying a foundation of a tower construction such as a wind turbine tower, a reinforced concrete element is often cast and subsequently, the turbine tower is positioned on the concrete element and fixed thereto. Often, the foundation includes an embedment section which is typically made of steel and has a circular shape corresponding to the shape of the tower. The embedment section includes a flange or similar interface for fixing the tower to the foundation.

When laying the foundation, the embedment section is firstly arranged such that the interface, and thus the tower, becomes accurately positioned. Subsequently, the reinforced concrete element is cast inside and about the embedment section whereby the embedment section becomes solidly fixed in a large block of concrete. Finally, the tower is anchored to the embedment section, typically by use of substantially vertical anchor rods or bolts through matching holes in adjacent flanges of the embedment section and the lowest tower section.

U.S. Pat. No. 5,586,417 discloses an example of a tower construction.

Due to the heavy weight of the tower construction, the connection between the embedment section and the concrete section is exposed to very large forces and cracks in the interface between these two sections are typically unavoidable. It is, however, of utmost importance that the embedment section continuously transfers the forces from the tower to the concrete section throughout the lifetime of the wind turbine.

SUMMARY

Embodiments in accordance with the present invention improve protection of a foundation for a wind turbine, and thus potentially increase the life time and reduce the maintenance costs for a wind turbine.

According to a first aspect, one embodiment in accordance with the invention provides a foundation for a wind turbine, the foundation comprising a concrete section and an embedment section, the embedment section comprising an embedded portion being embedded in the concrete section and an upright portion projecting upwardly from an upper surface of the concrete section and forming an interface for attaching a tower to the foundation, the foundation further comprising a cover arranged across an intersection between the upper surface and an outer surface of the upright portion. The cover comprises a blank of a sheet material formed with a hole having a shape matching a cross-sectional shape of the embedment section.

Due to the cover, intrusion of water between the embedment section and concrete section can be prevented and the expected lifetime of the foundation can be increased. In addition, the provision of a separate element to cover the intersection allows movement of the embedment section relative to the concrete section. Since the cover is formed as a sheet material with a hole, it becomes easy to arrange the cover about the upright portion which thereby holds the cover in place.

The concrete section would typically be much larger than the embedment section. As an example, the upper surface may have an area which is 5-10 times the area of the cross-section of the embedment section in the plane defined by the upper surface. Normally, the upper surface would be circular or quadrangular, and the cover would be made so that it essentially covers the entire upper surface, or at least 75-95 percent of the upper surface.

The hole with a shape which matches the shape of the embedment section may generally be smaller than the embedment section so that the cover can be heeled over the embedment section by elastic deformation of the cover material. For this purpose, the cover may preferably be made from a flexible and elastically deformable material such as a rubber material such as EPDM. Due to the elastic deformation, the cover may cover a portion of the upper surface, the transition between the concrete section and embedment section as well as a portion of the outer surface of the embedment section.

In one embodiment, the embedment section has a circular shape—i.e. in a cross section in plane with the upper surface or at least in a cross section perpendicular to the axial, oblong, direction of the tower, the shape is circular or faceted so that the shape becomes essentially circular. In this embodiment, the cover may have a hole which is circular and which has a diameter, for example, between 1 and 20 percent smaller than the outer diameter of the embedment section.

The blank may have a shape like a closed ring with an outer peripheral rim and an inner peripheral rim, where the inner peripheral rim extends about and thus defines the hole. To facilitate attachment of the blank to a foundation of an existing wind turbine tower, for example, during repair of the foundation, the blank may form an opening, for example, formed by a slit extending between the outer and inner peripheral rims. This will allow opening of the closed ring shape for attaching the blank around the embedment section.

The closed ring shape could be re-established by joining the opposite edges of the opening, for example, by providing these edges with Velcro™ or an adhesive etc.

The cover may be adhesively bonded to the upper surface of the concrete section by use of an adhesive which is suitable for sealing between a rubber cover and a concrete element, for example, a silicone based sealing compound or other adhesives known in the art.

The cover may also be adhesively bonded to the outer surface of the embedment section. In this case, for example, with an adhesive suitable for sealing between steel and rubber—again, this could be a silicone based adhesive or other adhesives known in the art.

The cover could be made in one single piece so that intrusion of water between separate pieces is prevented. The cover may also be made from several sheets of a material which can be solidly vulcanised, remoulded or in other ways bonded or welded in a water tight manner.

To protect the cover from mechanical impact, for example, from vehicles driving to and from the wind turbine tower, or to protect the cover from the sunlight, it may advantageously be covered by a layer of soil. In that event, however, it may be an advantage to arrange a layer of sand, or a layer of cloth or similar protective material between the cover and the soil.

Since the space between the cover and the concrete or embedment elements is difficult to access, one or more sensors which are capable of sensing moisture or humidity and which are capable of dispatching a corresponding surveillance signal out of the space, could be arranged in the space. In a similar manner, one or more sensors could be arranged on the outer surface of the embedment element prior to the casting of the concrete element. In this way, humidity entering the interface between the concrete element and the embedment element can be registered.

In one embodiment, the cover is provided in a size so that it covers not only a large part of the upper surface but also covers the entire outer surface of the embedment section and optionally also covers the interface between the embedment section and the first section of the tower. In this way, the risk of intrusion of water or humidity in the space between the cover and the embedment section may further be reduced. In general, however, the cover may advantageously cover the upper surface in a distance of at least one meter from the embedment section, and it may cover at least 10-30 centimetres of the outer surface of the embedment section from the upper surface and up.

In a second aspect, one embodiment in accordance with the invention provides a wind turbine comprising a foundation according to the above description.

In a third aspect, another embodiment in accordance with the invention provides a method of preventing intrusion of water in a wind turbine foundation of the kind where an embedment section is arranged with an embedded portion being embedded in a concrete section and with an upright portion projecting upwardly from an upper surface of the concrete section, the method comprising the steps of providing a cover of a water impermeable material and arranging the cover across an intersection between the upper surface and an outer surface of the embedment section. In particular, the cover may be adhesively bonded to the upper surface and to the outer surface.

BRIEF DESCRIPTION OF THE DRAWINGS

Examples of the invention will now be described with reference to the drawings in which.

Figure 1:
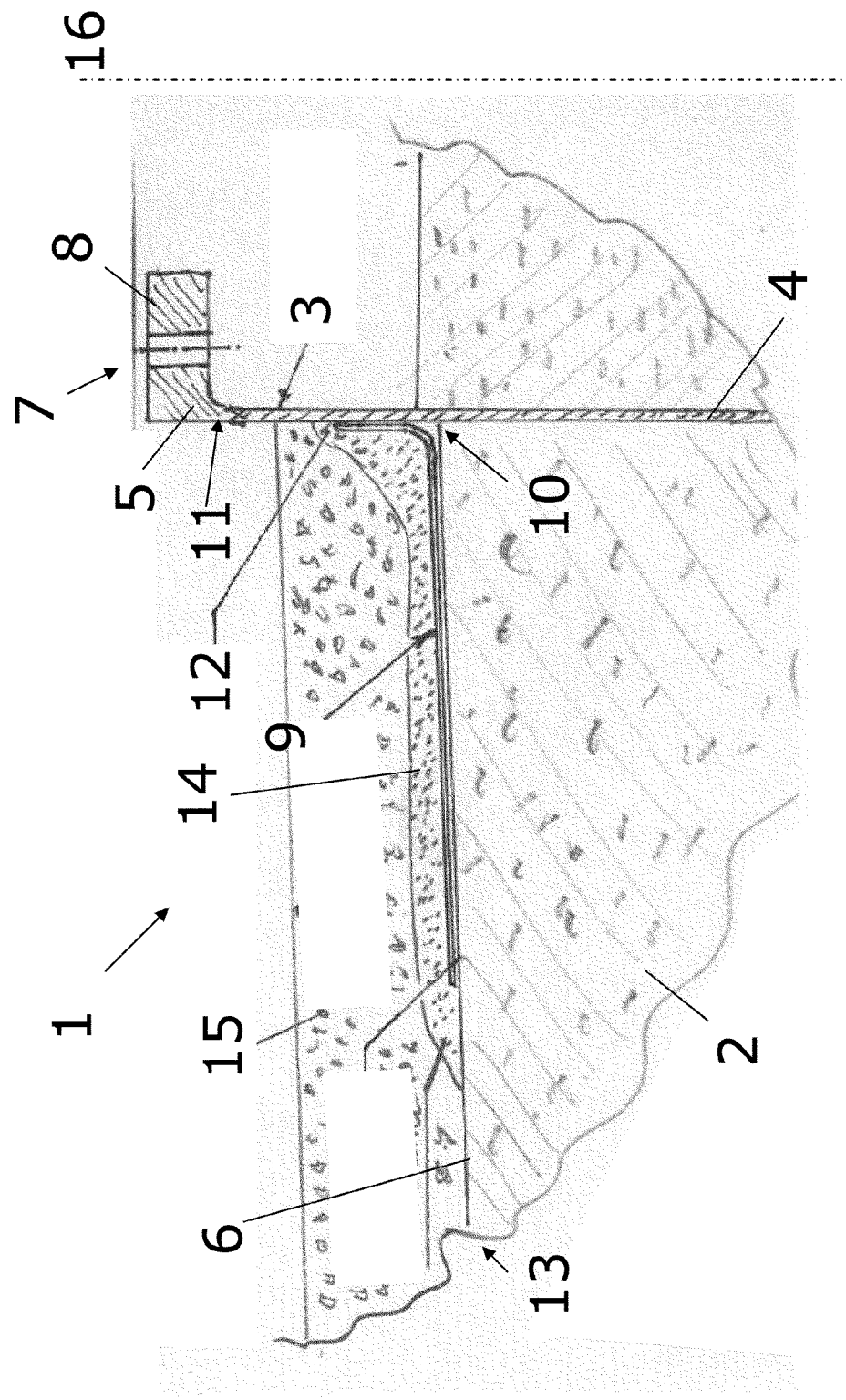
FIG. 1 illustrates in a cross section, a foundation according to the invention.

However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION

Herein, the foundation 1 comprises a concrete section 2 and an embedment section 3. The embedment section is partly embedded in the concrete section such that the lower, embedded, portion 4 is encapsulated in concrete and such that an upright portion 5 projects upwardly from an upper surface 6 of the concrete section. At the top end 7 of the upright portion, the embedment section 3 forms an interface 8 for attaching a tower to the foundation.

The foundation 1 further comprises a cover 9 arranged across an intersection 10 between the upper surface 6 and an outer surface 11 of the upright portion 5.

The cover is made from EPDM rubber and has a thickness of 2 mm. The size of the upper surface 6 of the concrete section 2 is 15×15 meter and the embedment section 3 has a diameter of 330 centimetres. The cover 9 is e.g. circular with a diameter of 4.9 meters or quadrangular with a size of 4.9× 4.9 meters.

The cover 9 has a hole with a diameter of 2.9 meters. Since the diameter of the hole is smaller than the outer diameter of the embedment section 3, the cover 9 may be elastically deformed by pressing the upright portion 5 through the hole in the cover.

Due to the elastic deformation of the cover, the cover may thereby extend, in one piece, along the upper surface 6, across the intersection 10 and continue upwardly along the outer surface 11 of the embedment section 3 without having to assemble separate sheets of the EPDM rubber. In this way, a good durability and water tight characteristics may be obtained and the foundation may therefore be protected against intrusion of water for a very long period of time.

Due to the elastic properties of the EPDM rubber, the cover 9 will tightly squeeze around the outer surface 11 of the embedment section 3 at the end 12 of the cover 9, and intrusion of water may already for that reason be prevented effectively. To further protect the foundation, a sealing compound, e.g., a silicone or tar based compound, may be provided between the outer surface 11 and the cover 9.

Optionally, a sealing compound, e.g., silicone or tar based, may also be provided between the upper surface 6 and the cover 9 to prevent water from intruding the space there between. To further prevent intrusion of water, the upper surface 6 of the concrete section 2 may have a downward angle from the embedment section 3 towards the edge 13 of the concrete section 2, relative to horizontal.

The cover 9 is covered with a layer 14 of sand, and the layer of sand is again covered with a layer of soil 15. The sand protects the EPDM rubber from being injured by stones or similar potentially sharp particles in the soil. The soil protects against erosion of the sand, and the sand and soil effectively protects the EPDM rubber, for example, from being slowly decomposed by the daylight.

As it appears, the use of a cover, not least a cover of an elastically deformable material provided with a hole of a size being smaller than the embedment section may effectively be used in a method for protecting a foundation against intrusion of water into the intersection between the concrete and an element being embedded in the concrete.

FIG. 1 illustrates the foundation in a cross section, and for simplifying the illustration, only one half of the foundation is illustrated. The dotted line 16 indicates the centre of the foundation. The embedment section extends circularly around this centre, and the concrete section is square with the centre at line 16.

Figure 2:
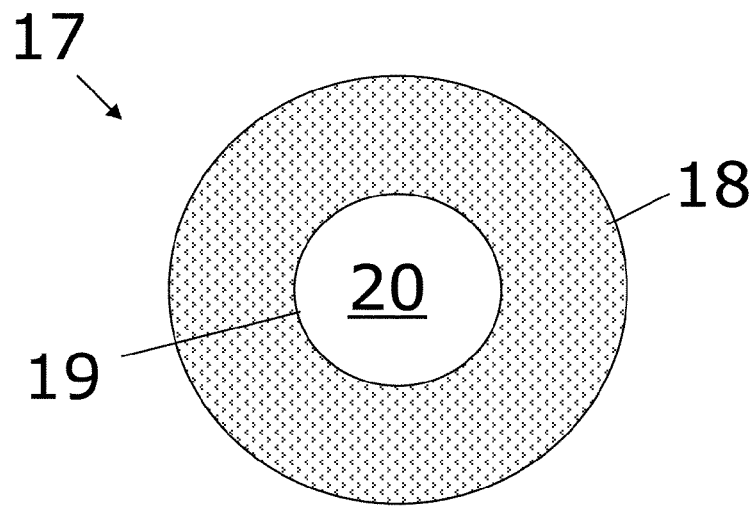
FIG. 2 illustrates the cover seen from above.

In FIG. 2, it is clearly shown that the blank has a shape like a closed ring 17 with an outer peripheral rim 18 and an inner peripheral rim 19. The inner peripheral rim extends about the hole 20 which is thereby defined by that inner rim.

Figure 3:
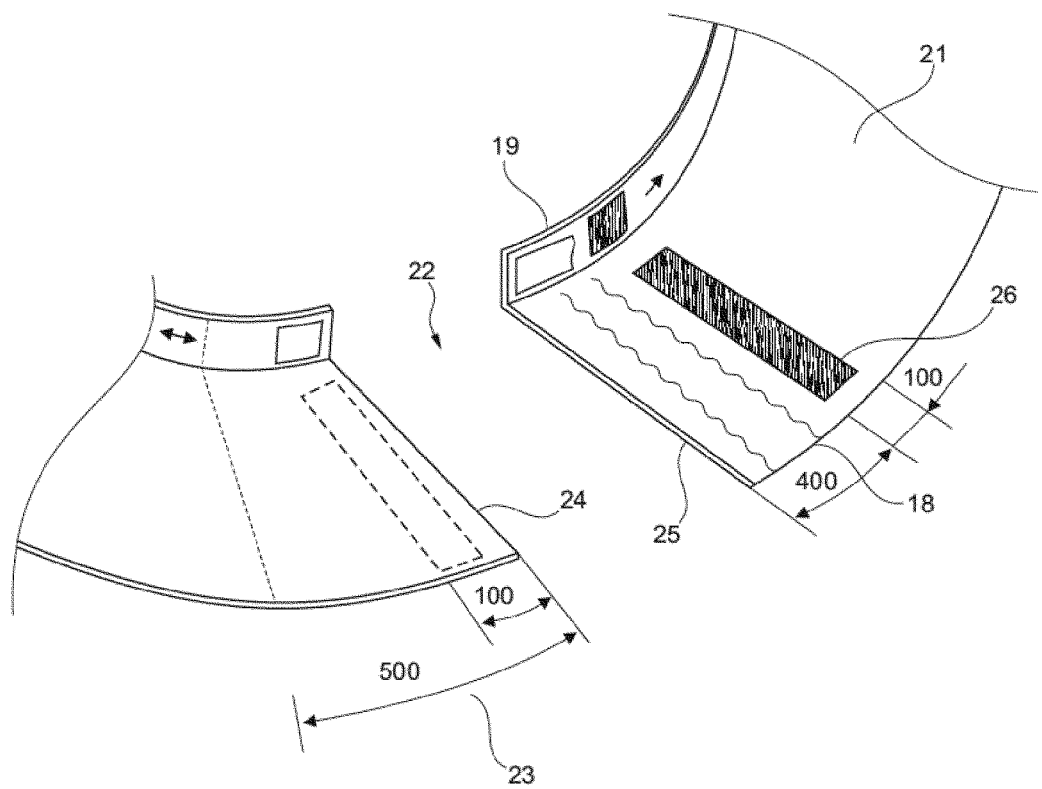
FIG. 3 illustrates an alternative embodiment with an opening allowing attachment of the cover to an already existing tower.

FIG. 3 illustrates an embodiment of the cover in which the blank 21 forms an opening 22 extending between the outer and inner peripheral rims 18, 19 to allow opening of the closed ring shape for attaching the blank around the embedment section. For re-establishing the closed shape, the blank is made with an overlap 23 of 200-500 mm in the peripheral direction such that one of the radial edges 24 of the opening overlaps the other radial edge 25 of the opening. In the overlap, the blank could be made with Velcro 26 or an adhesive etc. for holding the edges 24, 25 assembled.

What is claimed is:

1. A foundation for a wind turbine, comprising:
   a concrete section;
   an embedment section, the embedment section comprising an embedded portion being embedded in the concrete section and an upright portion projecting upwardly from an upper surface of the concrete section and forming an interface for attaching a tower to the foundation; and
   a cover arranged across an intersection between the upper surface and an outer surface of the upright portion, wherein the cover comprises a blank of a sheet material formed with a hole having a shape matching a cross-sectional shape of the embedment section.

2. The foundation according to claim 1, wherein the cover is adhesively bonded to at least one of the upper surface and the outer surface.

3. The foundation according to claim 1, wherein the hole has an area being smaller than the area of the matching cross-sectional shape.

4. The foundation according to claim 1, wherein the embedment section has a circular cross-sectional shape and the cover forms a hole with a diameter being smaller than the diameter of the embedment section.

5. The foundation according to claim 1, wherein the cover is made from EPDM.

6. The foundation according to claim 1, wherein the cover is covered with a layer of sand.

7. The foundation according to claim 6, wherein the sand is covered with a layer of soil.

8. The foundation according to claim 1, wherein the cover covers the upper surface in a distance of at least one meter from the embedment section.

9. The foundation according to claim 1, wherein the cover covers in one piece, a major portion of the upper surface and an outer surface of the embedment section from the intersection to the interface for attaching the tower.

10. A wind turbine comprising a foundation according to claim 1.

* * * * *